United States Patent
Labombarda et al.

(10) Patent No.: US 10,814,744 B2
(45) Date of Patent: Oct. 27, 2020

(54) SAFETY ELECTRONIC DEVICE FOR PRESENCE DETECTION INSIDE A VEHICLE

(71) Applicant: STMicroelectronics S.r.l., Agrate Brianza (IT)

(72) Inventors: Andrea Labombarda, Milan (IT); Eleon Borlini, Gorno (IT); Livio Gasparetto, Segrate (IT)

(73) Assignee: STMICROELECTRONICS S.r.l., Agrate Brianza (IT)

(*) Notice: Subject to any disclaimer, the term of this patent is extended or adjusted under 35 U.S.C. 154(b) by 0 days.

(21) Appl. No.: 16/222,569

(22) Filed: Dec. 17, 2018

(65) Prior Publication Data
US 2019/0193590 A1 Jun. 27, 2019

(30) Foreign Application Priority Data

Dec. 22, 2017 (IT) .......................... 102017000149196

(51) Int. Cl.
*B60N 2/00* (2006.01)
*B60Q 5/00* (2006.01)
(Continued)

(52) U.S. Cl.
CPC ............... *B60N 2/002* (2013.01); *B60N 2/26* (2013.01); *B60Q 1/52* (2013.01); *B60Q 5/005* (2013.01); *G01K 1/14* (2013.01); *G01P 15/18* (2013.01); *G01V 1/001* (2013.01); *G08B 21/22* (2013.01); *G08B 21/24* (2013.01)

(58) Field of Classification Search
CPC ........ G01V 1/001; G08B 21/22; B60N 2/002; B60N 2/26; B60N 2002/0272; G01P 13/00; G06K 9/00362; B60R 21/01512
See application file for complete search history.

(56) References Cited

U.S. PATENT DOCUMENTS 9,227,484 B1 1/2016 Justice et al.
9,845,050 B1 * 12/2017 Garza ................ G08B 21/0205
(Continued)

FOREIGN PATENT DOCUMENTS

WO 2015/138741 A1 9/2015

OTHER PUBLICATIONS

McGluan, "Galaxy S5 hidden Baby crying detector feature discovered," Mar. 31, 2014, retrieved from https://www.slashgear.com/galaxy-s5-hidden-baby-crying-detector-feature-discovered-31323024 on Jan. 9, 2018, 6 pages.

*Primary Examiner* — Mirza F Alam
(74) *Attorney, Agent, or Firm* — Seed IP Law Group LLP

(57) ABSTRACT

An electronic device for detecting the presence of an occupant on board a vehicle includes an audio sensor to acquire sound-sensing signals on board the vehicle. A movement sensor acquires movement-sensing signals associated with movement of the vehicle and an environmental sensor acquires environmental-sensing signals on board the vehicle. A processing unit is coupled to the audio sensor, movement sensor, and environmental sensor processes the respective sound-sensing signals, movement-sensing signals, and environmental-sensing signals to monitor the presence on board the vehicle of the occupant and the absence of a responsible person to determine a situation of danger and to activate a corresponding alarm warning.

18 Claims, 7 Drawing Sheets

(51) Int. Cl.
  *B60Q 1/52* (2006.01)
  *G01P 15/18* (2013.01)
  *G01V 1/00* (2006.01)
  *G01K 1/14* (2006.01)
  *B60N 2/26* (2006.01)
  *G08B 21/22* (2006.01)
  *G08B 21/24* (2006.01)

(56) References Cited

U.S. PATENT DOCUMENTS

| | | | |
|---|---|---|---|
| 2002/0161501 A1* | 10/2002 | Dulin | B06B 1/0215 701/45 |
| 2006/0251293 A1* | 11/2006 | Piirainen | B60N 2/002 382/104 |
| 2009/0040036 A1* | 2/2009 | Talis | B60N 2/002 340/457.1 |
| 2009/0212955 A1* | 8/2009 | Schoenberg | B60N 2/002 340/573.1 |
| 2012/0050021 A1 | 3/2012 | Rao et al. | |
| 2013/0194089 A1* | 8/2013 | Estrada | G08B 21/22 340/457.1 |
| 2019/0096243 A1* | 3/2019 | Doig | G08G 1/091 |

\* cited by examiner

SAFETY ELECTRONIC DEVICE FOR PRESENCE DETECTION INSIDE A VEHICLE

BACKGROUND

Technical Field

The present solution relates to an electronic detection device for presence detection inside a vehicle, made with MEMS (Micro-Electro-Mechanical System) semiconductor technology. In particular, this device constitutes a safety device designed to detect the presence of at least one occupant, for example a baby (an infant or a very young child) or an animal, left alone inside the vehicle, without the presence of an adult or other person responsible, and designed to activate, upon detection, suitable alarms and warnings.

Description of the Related Art

As it is known, although rarely, events may occur whereby the driver of a vehicle (in general a parent) forgets a child in the passenger compartment of the vehicle and leaves the vehicle, leaving the child inside; the child is generally sitting in a baby seat or similar safety restraint device, on the back seat of the vehicle. Such events may, for example, be caused by a pathological disorder, the so-called dissociative amnesia, which may lead a parent to forget having brought the child along in the vehicle.

In adverse weather conditions, for example in the presence of high temperatures, or in general in dangerous environmental conditions, the child left in the vehicle may suffer serious repercussions, which may even lead, in the worst case, to death.

It is evident that what has been mentioned in the case of a child may likewise apply in the case of an animal left in a vehicle or, in general, of a person who may not be able to get out of the vehicle on his/hers own or to notify the situation of danger (for example, due to a temporary or permanent disability).

To overcome this problem, solutions for monitoring and generation of alarms have been proposed, having the aim of detecting, and duly warning of, a situation of danger in which a subject has been left behind in a vehicle.

For instance, systems have been proposed capable of monitoring the weight of the subject sitting in the back seat of the vehicle, or else video systems capable of acquiring and processing images of the subject, or again thermal systems, capable of processing thermal maps of the passenger compartment of the vehicle.

However, none of the solutions proposed has proven satisfactory, both because they entail considerable costs and complexity of realization and because they do not afford, in any case, an adequate reliability and safety.

BRIEF SUMMARY

An aim of the present disclosure is to provide a solution that will enable at least some of the drawbacks of the prior art to be overcome.

According to the present disclosure, embodiments of electronic presence-detection devices and methods are consequently provided.

BRIEF DESCRIPTION OF THE SEVERAL VIEWS OF THE DRAWINGS

For a better understanding of the present disclosure preferred embodiments thereof are now described, purely by way of non-limiting example, with reference to the attached drawings, wherein.

DETAILED DESCRIPTION

As will be clarified in detail hereinafter, one aspect of the present solution envisages exploiting semiconductor technology, in particular MEMS technology, to provide an integrated electronic device capable of: detecting a number of quantities inside the passenger compartment of the vehicle, via appropriate sensors; and jointly processing the values detected for said quantities with a suitable processing algorithm in order to detect the presence of an occupant of the vehicle (for example, a baby or young child) left alone inside the same vehicle, assess the potential danger of the situation and, if need be, generate an appropriate alarm or warning to warn of the situation of danger.

Figure 1:
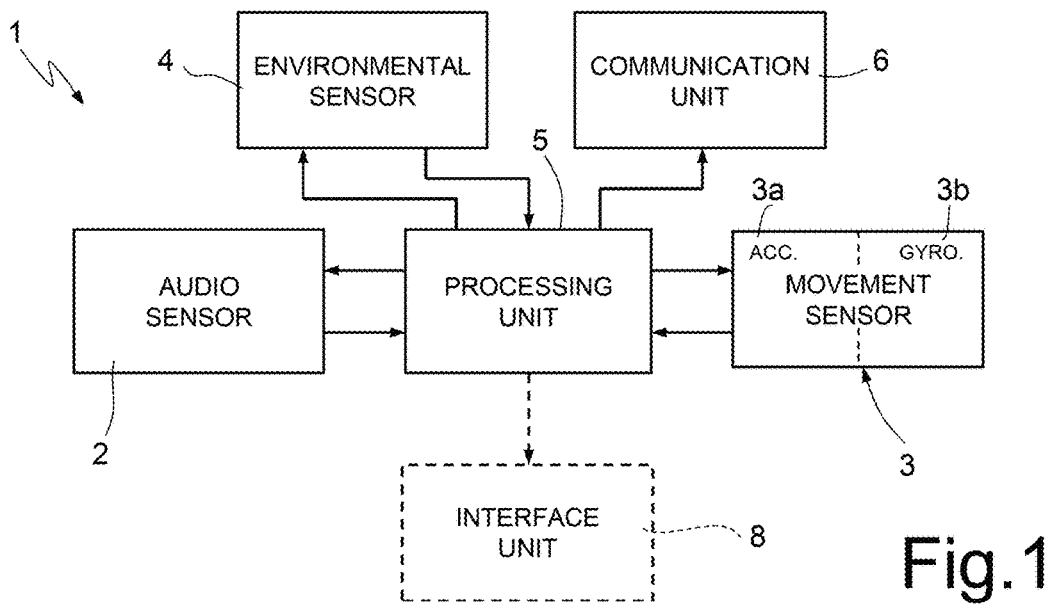
FIG. 1 is a block diagram of an electronic presence-detection device according to one embodiment of the present solution.

FIG. 1 is a schematic block diagram of an electronic detection device 1, according to one embodiment of the present solution.

In the embodiment of FIG. 1, the electronic detection device 1 includes:

an audio sensor 2, in particular including a microphone sensor made using MEMS technology, designed to implement a detection of sounds in the passenger compartment of the vehicle, in particular to detect the presence on board of a child (and/or other occupant) and monitor the presence or absence of a responsible person (for example, the driver);

a movement sensor 3, in particular including an accelerometer sensor 3a and a gyroscope sensor 3b, both of which are triaxial and are made with MEMS technology, and which are designed to implement monitoring of the state of movement, for example of the vehicle, via detection of corresponding linear and angular accelerations (the aforesaid accelerometer and gyroscope sensors 3a and 3b may be integrated in a single MEMS sensor, having a total of six axes of detection);

an environmental sensor 4, which is designed to monitor the environmental conditions inside the vehicle and, in particular, includes a temperature sensor designed to detect the temperature on board the same vehicle;

a processing unit 5, for example including a microcontroller, a microprocessor, an FPGA (Field-Programmable Gated Array) or a similar digital data-processing unit, which is connected to the audio, movement, and environmental sensors 2, 3, and 4, respectively, receives corresponding sensing signals, and is provided with an (internal or external) non-volatile memory that stores computer instructions for implementing an algorithm (a so-called sensor-fusion algorithm) for joint processing of the signals detected by the aforesaid sensors, in particular in order to determine a situation of danger for an occupant on board the vehicle; and a communication unit 6, coupled to the processing unit 5 and controlled thereby for transmission at a distance (i.e., remotely) of an alarm communication, for example aimed at the driver of the vehicle (or other responsible person), regarding the occupant detected alone on board the vehicle; the communication unit 6 may include a mobile data-communication module (for example, using the GSM, UMTS, or LTE standards) and an associated identification module for access to the cellular network (for example, a SIM—Subscriber Identity Module—data card), or, alternatively, any sort of remote data-communication module.

The electronic detection device 1 may further comprise an interface unit 8 configured to enable interfacing with an ECU (Electronic Control Unit) of the vehicle, for example in order to activate a vehicle alarm in the case where a condition of danger is detected, or else to interface with a data-communication unit of the same vehicle.

The electronic detection device 1 may further be provided with an autonomous supply source (here not illustrated), for example a battery source, designed to supply a voltage for operation of the electronic detection device 1; the autonomous supply source may be coupled to a supply source of the vehicle and provided with a recharging function using the same supply source of the vehicle, when the engine is running.

The electronic detection device 1 may further be provided with its own alarm warning means (not illustrated), via emission of sounds or light warnings, controlled by the processing unit 5 and activated upon detection of a condition of alarm.

Figure 2:
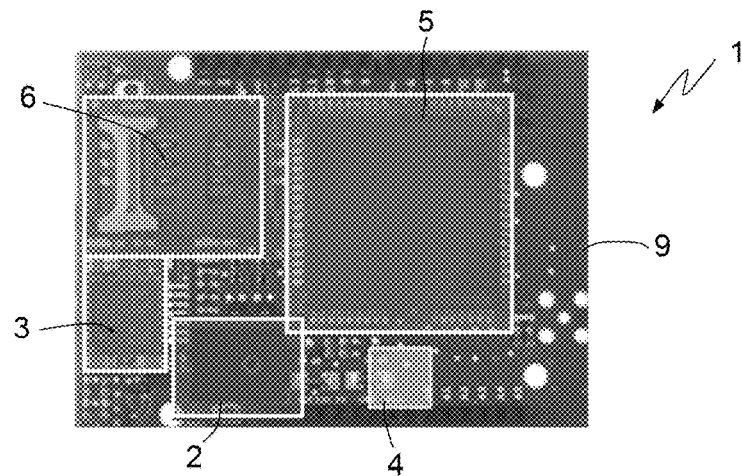
FIG. 2 is a schematic illustration of an electronic-circuit board, integrating the electronic device of FIG. 1.

As illustrated schematically in FIG. 2, the electronic detection device 1 may be made in an electronic-circuit board (the so-called PCB—Printed-Circuit Board) 9, electrically coupled to which are the constituent components (in particular, the aforesaid audio sensor 2, movement sensor 3, environmental sensor 4, the aforesaid processing unit 5, and the aforesaid communication unit 6), integrated in respective chips having a package, housing one or more dies of semiconductor material.

The electronic detection device 1 may be provided as an autonomous stand-alone device that is to be appropriately coupled to the vehicle to be monitored, including after-market installations.

Figure 3A:
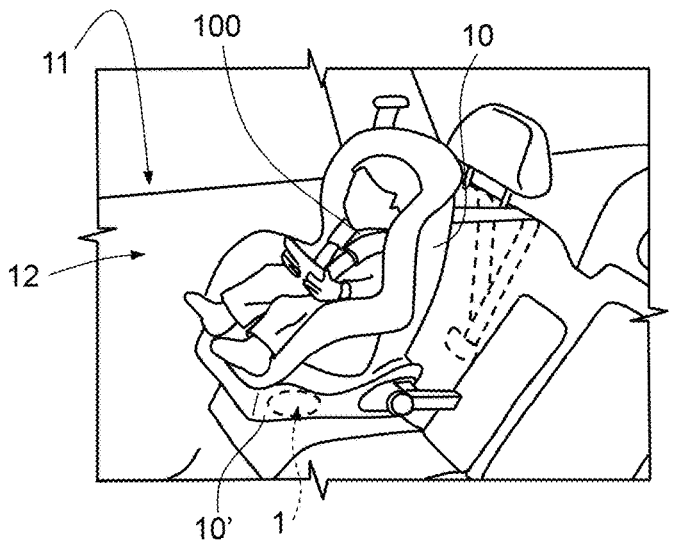
FIG. 3A is a schematic depiction of integration of the electronic device of FIG. 1 in a safety and restraint device for a baby or young child on board a vehicle.

Moreover, as illustrated schematically in FIG. 3A, the electronic detection device 1 may be integrated within a baby-restraint device 10, the so-called baby seat, designed to accommodate a baby or young child, here designated by 100, and to be safely coupled to the vehicle seat (for example, a back seat) in the passenger compartment 11 of a vehicle 12; for example, the electronic detection device 1 may be incorporated in a base 10' of the restraint device 10, and purposely designed electrical-connection systems (here not illustrated) may be provided for interfacing with the electronic system of the vehicle 12.

Figure 3B:
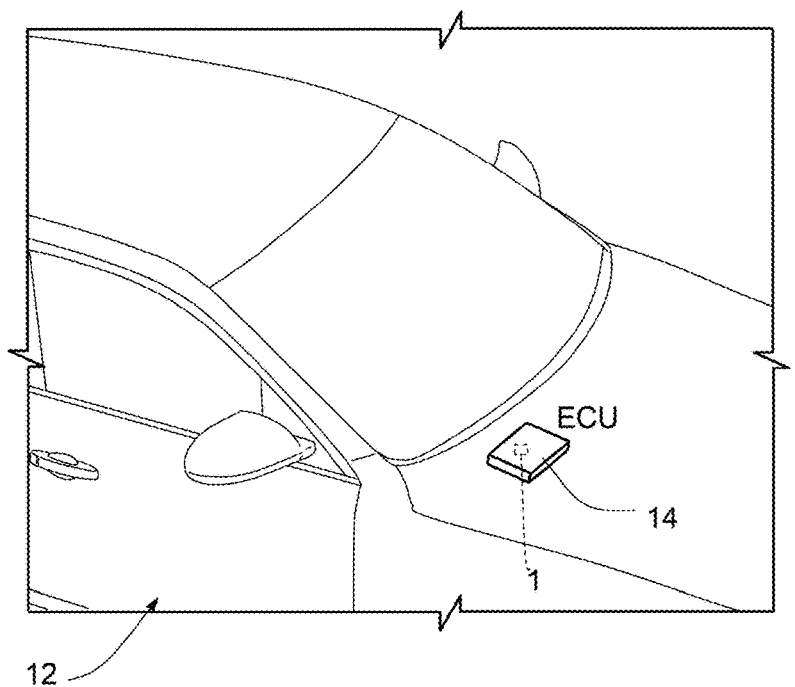
FIG. 3B is a schematic depiction of integration of the electronic device of FIG. 1 in an on-board electronic system of a vehicle.

In a possible alternative solution, illustrated schematically in FIG. 3B, the electronic detection device 1 may be incorporated in the electronic system of the vehicle 12. In this case, the processing unit 5 of the electronic detection device 1 may be incorporated in the ECU 14 of the vehicle 12 (the ECU being, in this case, itself provided with a non-volatile memory that stores computer instructions for implementing the aforementioned sensor-fusion algorithm for joint processing of the signals in order to determine the situation of danger). Furthermore, the audio, movement, and environmental sensors 2, 3, and 4, may in this case coincide with corresponding sensors on board the vehicle 12, which have further functions for controlling the general operation of the vehicle 12. In this embodiment, the communication unit 6 may be implemented by a communication module present inside the vehicle 12, for example having an own SIM card for GSM data communication, or else enabled for satellite communication, or designed to implement any other form of remote data communication.

The features of the electronic detection device 1 are now described in greater detail.

The audio sensor 2, in particular the MEMS microphone sensor, is designed to detect audio signals indicating the presence on board the vehicle 12 of the driver (i.e., of the adult, parent, or in any case person responsible for the occupant) and/or of the occupant, or occupants (for example, a child or an animal).

The above audio signals may be suitably processed by the processing unit 5 of the electronic detection device 1, for example with techniques (in themselves known and not described in detail herein) of recognition of characteristic patterns for identification, for example, of sounds that characterize the speech of the adult or the crying of the child (or the characteristic sound of an animal, for example the barking of a dog).

The audio sensor 2 may further enable detection and identification of sounds associated with movement of the vehicle 12, for example the sound of the engine running, or the noise of rolling of the wheels, in this way contributing to monitoring the state of movement of the same vehicle 12, as discussed hereinafter.

Figure 4A:
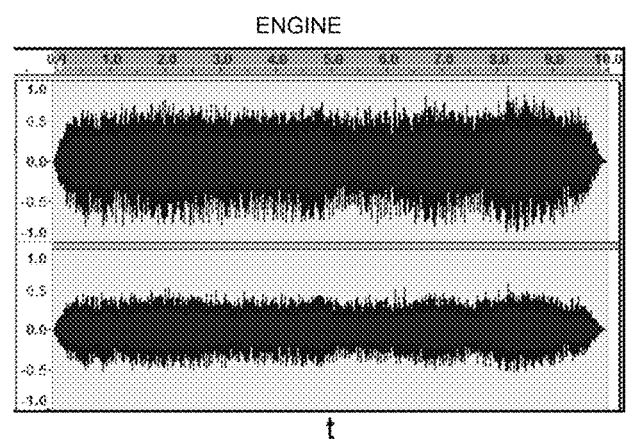
FIGS. 4A-4B, 5A-5B, 6A-6B, and 7A-7C show plots of sensing signals that may be processed in the electronic device of FIG. 1.
Figure 4B:
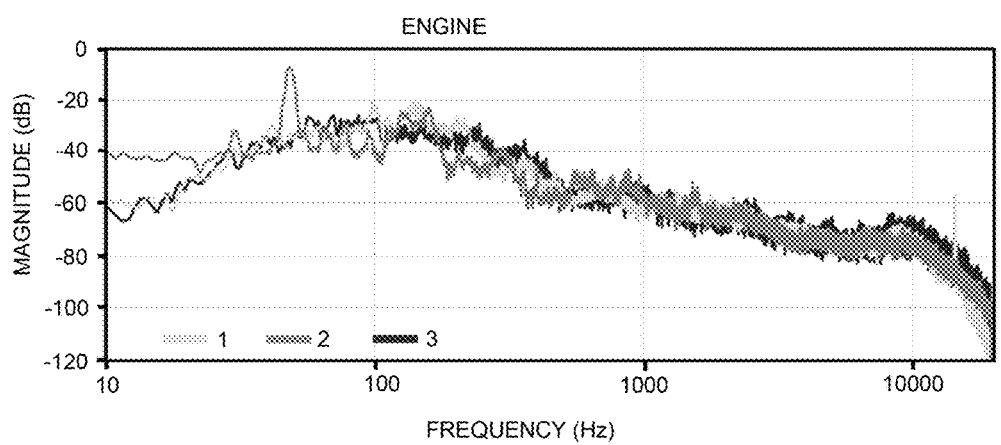
Figure 5A:
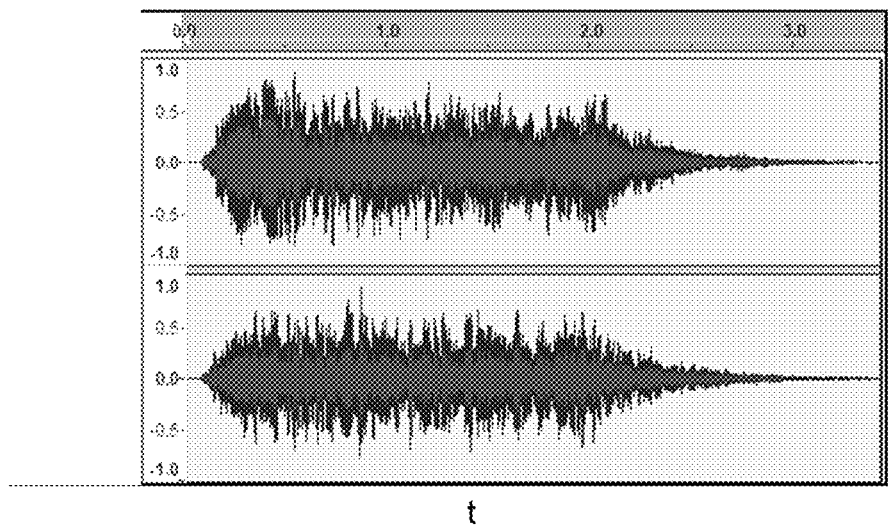
Figure 5B:
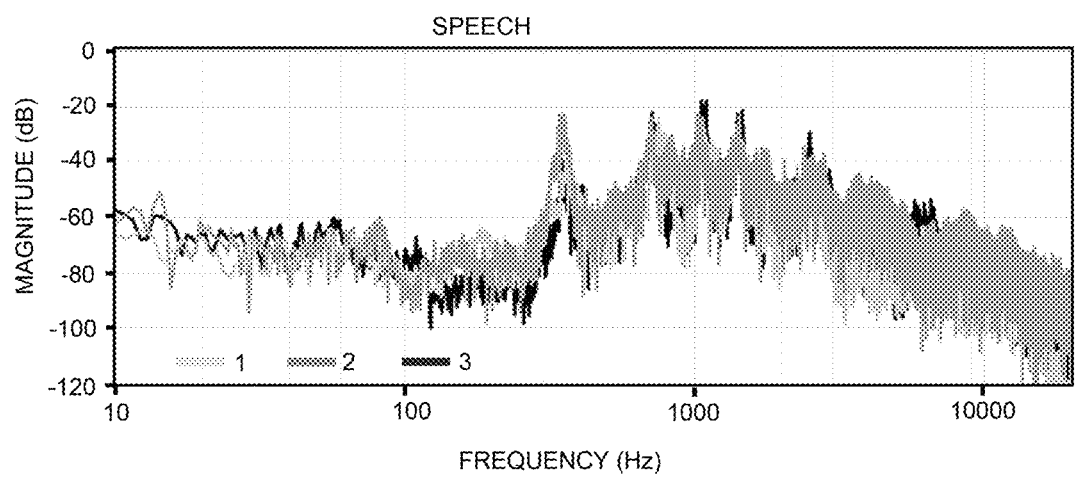
Figure 6A:
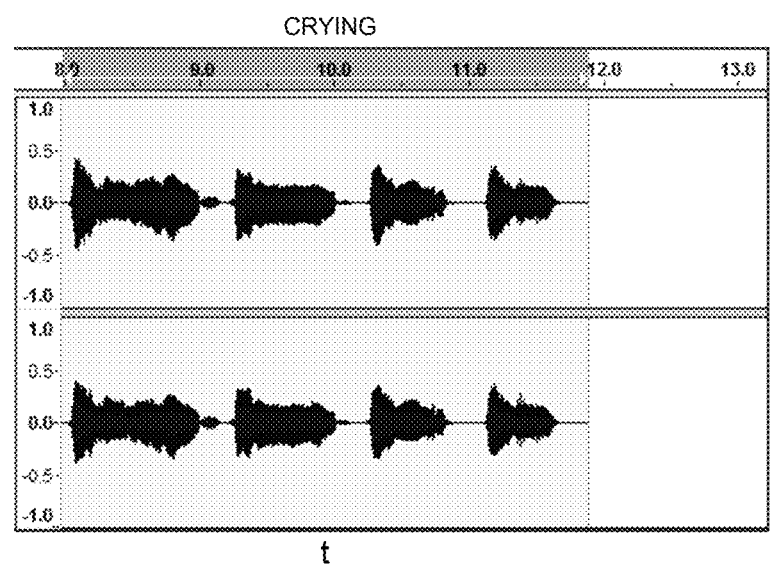
Figure 6B:
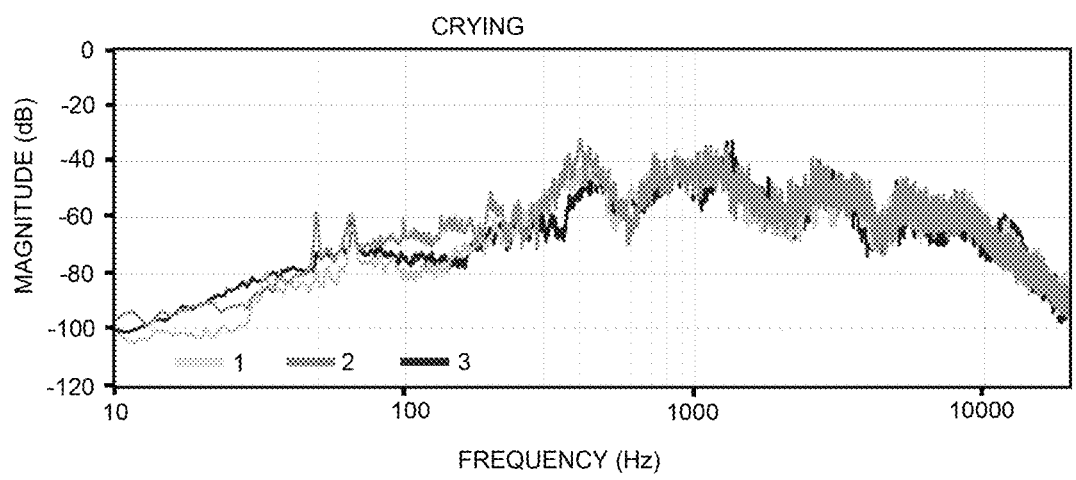

Purely by way of example, FIGS. 4A and 4B show the plot of audio signals, in the time domain and frequency domain, respectively, associated with movement of the vehicle 12, in particular to the noise of the engine; FIGS. 5A and 5B show the plot of audio signals, respectively in the time domain and frequency domain, associated with the speech of an adult; and FIGS. 6A and 6B show the plot of audio signals, in the time domain and frequency domain respectively, associated with the crying of a child.

The above plots, provided by way of example, illustrate the different characteristic patterns of the aforesaid signals and hence how it is effectively possible, via analysis of the audio signals in the time and frequency domains, to discriminate and recognize the different sources of sounds inside the vehicle 12.

In particular, the processing unit 5 may be configured to acquire the audio signals detected by the audio sensor 2 and to implement appropriate decision tools, such as decision trees, neural networks, and appropriate tools of analysis in the time domain, such as analysis of the temporal repeatability of the signal, or in the frequency domain, such as analysis of the predominant frequency or analysis of the spectral components in various bands of interest (for example, via analysis of the so-called octave-relative power spectrum).

Figure 7A:
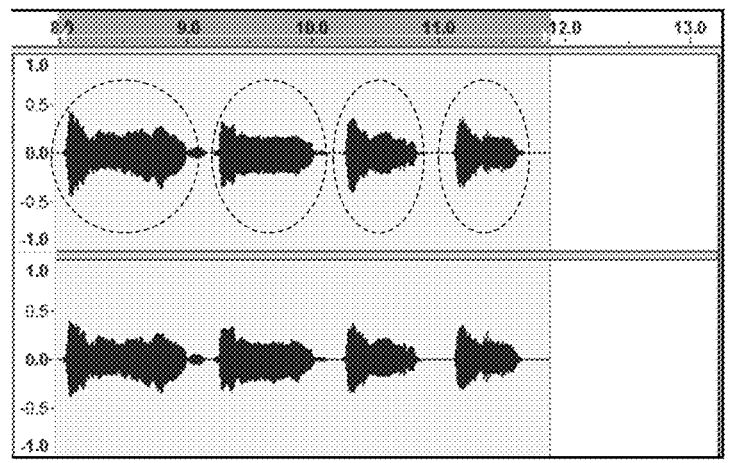
Figure 7B:
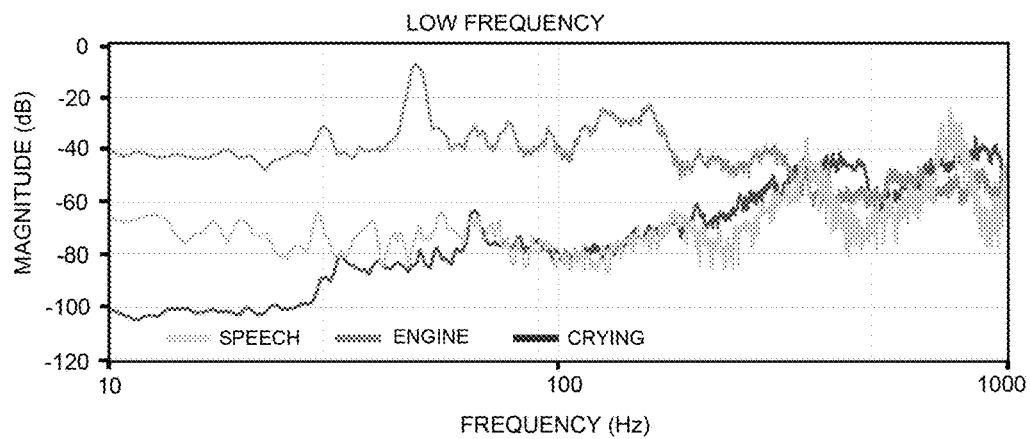
Figure 7C:
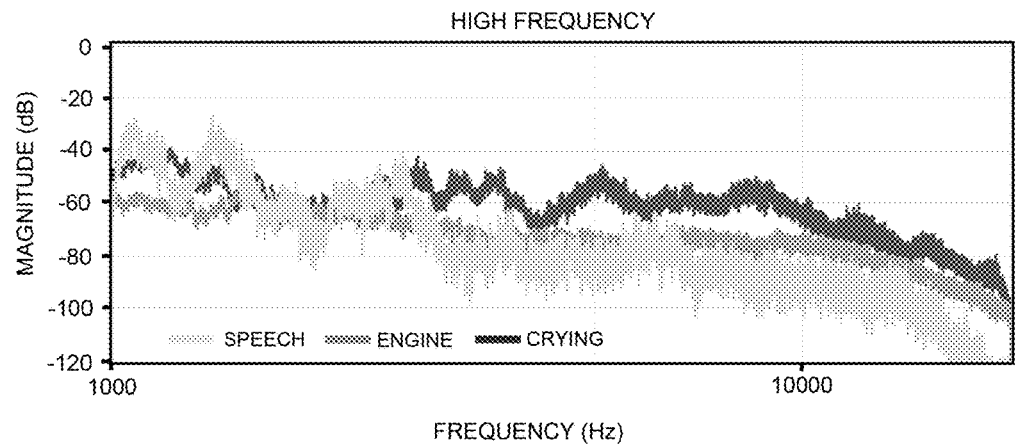

In this regard, FIG. 7A shows the plot of the signal associated with the crying of a child in the time domain, with highlighted the characteristic of repeatability of corresponding portions of the audio signal, whereas FIGS. 7B and 7C show the comparison of the spectra in the low-frequency band and high-frequency band, respectively, of the audio signals associated with the crying of a child, the running of the engine, and the speech of an adult, once again highlighting the possibility, by comparison, of discriminating the source of the same audio signals.

The audio sensor 2 may further comprise a microphone sensor dedicated to operations (of a per se known type, here not described) of noise cancelling. For example, the microphone sensor may be dedicated to the specific detection of the noise of the engine of the vehicle 12 in order to enable elimination thereof from the resulting audio signal and facilitate recognition of the components associated with the driver and the occupant of the vehicle 12, during processing of the respective signals.

The movement sensor 3, in particular including the accelerometer sensor 3a and the gyroscope sensor 3b, is designed to enable detection of movement of the vehicle 12. Furthermore, in addition to this function, the movement sensor 3, appropriately located, may also detect the movement of the occupant of the vehicle 12, for example the movements of the child, and/or the movement of the driver, in order to contribute to presence detection on board the same vehicle 12.

The environmental sensor 4 is designed to monitor the environmental conditions on board the vehicle 12 in order to identify a condition of danger for the occupant (or occupants). For instance, the environmental sensor 4, as mentioned previously, may include a temperature sensor, designed to detect the temperature in the vehicle 12, which, if higher than an upper threshold (designated in what follows by $T_{LIM\_H}$), or lower than a lower threshold (designated in what follows by $T_{LIM\_L}$), is indicative of a condition of environmental stress (e.g., "too hot" or "too cold").

In addition, or as an alternative, the environmental sensor 4 may include different and further sensors aimed at identification of the condition of danger inside the vehicle 12, such as a gas sensor (designed to identify harmful gaseous species in the air), a humidity sensor and/or a pressure sensor.

The processing unit 5, as mentioned previously, is designed to acquire the various signals detected by the audio, movement, and environmental sensors 2, 3, and 4, and to implement an appropriate sensor-fusion algorithm for promptly detecting the situation of danger for the occupant of the vehicle 12, activating appropriate actions of alarm (for example, remote communication to the person responsible, or local activation of visual or sound alarms).

Figure 8:
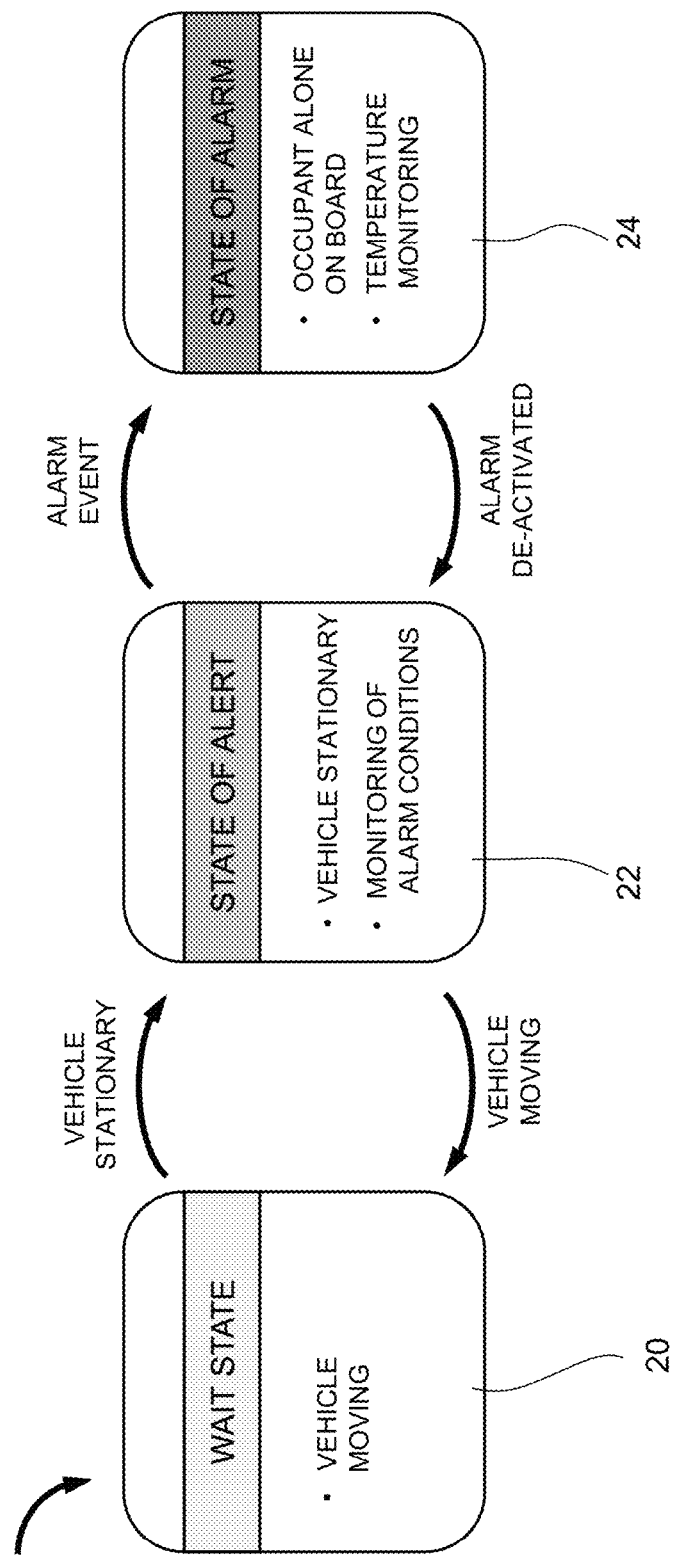
FIG. 8 is a state diagram of one embodiment of an algorithm implemented in the detection device of FIG. 1.

With reference to FIG. 8, a possible algorithm is now illustrated, implemented by the processing unit 5, in this case in the form of a finite state machine (FSM), which transitions or evolves, as a function of the signals detected and of their joint processing, between: a first state, designated by 20, indicating a stand-by situation (or a situation of substantial absence of danger for the occupant); a second state, designated by 22, indicating a situation of alert, anticipatory to a situation of alarm; and a third state, designated by 24, indicating the effective situation of alarm.

In detail, in the first state 20, the processing unit 5 detects the state of movement of the vehicle 12, with the engine running; the processing unit 5 thus presumes the presence of a person responsible on board (the driver, an adult) and hence the absence of danger for the occupant (or occupants).

Monitoring of the first state is implemented substantially using the movement sensor 3; the audio sensor 2 may be used, in addition to the movement sensor 3, for detecting the movement of the vehicle 12 and the condition of running of the engine of the same vehicle 12, or otherwise may be set in an inactive or low-consumption state; also the other unused components of the electronic detection device 1 (amongst which the environmental sensor 4, or the communication unit 6) may be set in the inactive state, so as to limit the overall power consumption.

From the first state 20 the processing unit 5 transitions or evolves to the second state 22, when it determines that the vehicle 12 has stopped; likewise, from the second state 22, the processing unit 5 transitions or returns to the first state 20, when it determines that the vehicle 12 is again moving.

In the second state 22, the processing unit 5 hence detects that the vehicle 12 is stationary (absence of movement and engine off), and hence enters a state of alert, in which it monitors the onset of conditions of alarm that may lead to the state of danger, i.e., the presence of the child (or animal or, in general, other occupant) left alone inside the vehicle 12, in the absence of the person responsible, namely, the driver.

Monitoring of this second state 22 is basically carried out by continuous acquisition and processing of the signals coming from the audio sensor 2 in order to detect the presence of the driver and/or of the occupant in the vehicle 12; the movement sensor 3 may be used, in addition to the audio sensor 2, for presence detection, or otherwise may be set in an inactive or low-consumption state, as likewise the other unused components of the electronic detection device 1, so as to limit also in this case power consumption.

From the second state 22 the processing unit 5 transitions or evolves to the third state 24, i.e., the state of alarm, when it determines the persistence of the condition of potential danger for the occupant, who is left alone inside the vehicle 12 in the absence of the responsible person, for a time interval the duration of which exceeds an alarm threshold of a pre-set value, for example of some minutes (e.g., five minutes); from the third state 24 the processing unit 5 returns to the second state 22, when the state of alarm is deactivated. In particular, it may be required that deactivation of the state of alarm should be carried out manually by the responsible person, for example by the driver of the vehicle 12, so as to increase safety and reliability of the electronic detection device 1.

In detail, in the third state 24, the processing unit 5, upon activation of the state of alarm, determines the presence of a first level of alarm, corresponding to the permanence of the occupant (for example, the child) alone inside the vehicle 12 in the absence of the driver for a time interval longer than the pre-set alarm threshold (exceeding of the threshold indicates a possible situation of risk for the occupant). The first level of alarm entails activation of a first alarm warning by the detection unit 5, for example activation of a communication to the responsible person by the communication unit 6, including, for example, sending via the GSM module of an SMS (Short Message Service) message.

The processing unit 5, which continues to monitor the situation of danger, in real time, then determines the presence of a second level of alarm in the case where the signals supplied by the environmental sensor 4 indicate a harmful environmental condition, for example in the case where the temperature detected has a given relation with an alarm threshold (for example, it is higher than the upper threshold, $T > T_{LIM\_H}$, indicating a condition of "too hot," or lower than the lower threshold $T < T_{LIM\_H}$, indicating a condition of "too cold").

The second level of alarm entails activation of a second alarm warning by the detection unit 5, for example via activation of every available alarm, locally at the vehicle 12 (via activation of sound and visual alarms) and remotely via communication by the communication unit 6 to the responsible person and/or to further subjects authorized for emergency interventions.

Figure 9A:
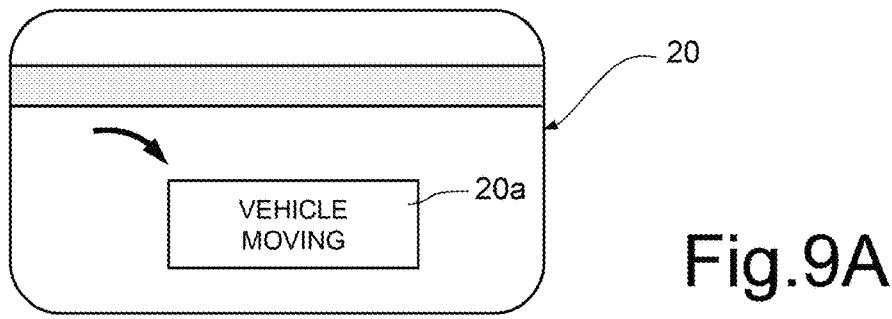
FIGS. 9A-9C are schematic diagrams regarding a first state, a second state, and a third state of the state diagram of FIG. 8.

In greater detail, and as illustrated in FIG. 9A, the first state 20 is represented by a single sub-state 20a, which corresponds to continuous monitoring, by the processing unit 5 that analyses the signals coming from the movement sensor 3, of the state of movement or stopping of the vehicle 12 and of the on/off state of the engine. As mentioned previously, also the signals acquired by the audio sensor 2 may be used for this detection. All the other components of the electronic detection device 1 are set in a low-consumption condition or deactivated.

Figure 9B:
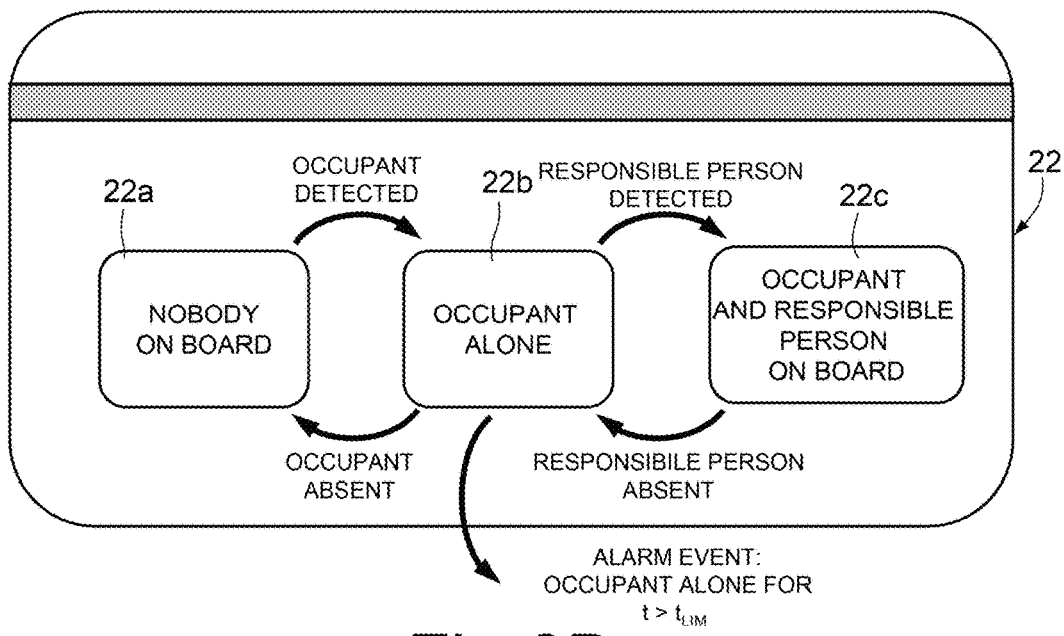

The second state 22, as illustrated in FIG. 9B, envisages: a first sub-state 22a, in which the processing unit 5 determines the absence of occupants in the vehicle 12 and the absence of the driver; a second sub-state 22b, in which the processing unit 5 determines the presence of an occupant (for example, a baby or small child) left alone inside the vehicle 12 in the absence of the driver (or responsible person); and a third sub-state 22c, in which the processing unit 5 determines the simultaneous presence on board of both the occupant and the driver.

In an evident way, from the first sub-state 22a the processing unit 5 transitions or evolves to the second sub-state 22b in the case of detection of the presence of the occupant, and from the second sub-state 22b it transitions or evolves to the first sub-state 22a if no occupant is detected inside the vehicle 12. Likewise, from the second sub-state 22b it transitions or evolves to the third sub-state 22c in the case of detection of the presence of the driver, and from the third sub-state 22c it transitions or evolves to the second sub-state 22b if the presence of the driver inside the vehicle 12 is not detected.

If the second sub-state is maintained for a time interval longer than the alarm threshold (here designated by $t_{LIM}$), the processing unit 5 transitions or evolves to the third state 24, whereas detection of movement of the vehicle 12 determines at any moment return to the first state 20, in so far as it is presumed that the driver, an adult, is present inside the vehicle 12.

As previously mentioned, in this second state 22 there is a continuous monitoring of the signals supplied by the audio sensor 2 in order to implement recognition of the occupant and of the driver. The signals acquired by the movement sensor 3 may further be monitored, for example by pattern-recognition techniques, as previously discussed.

Figure 9C:
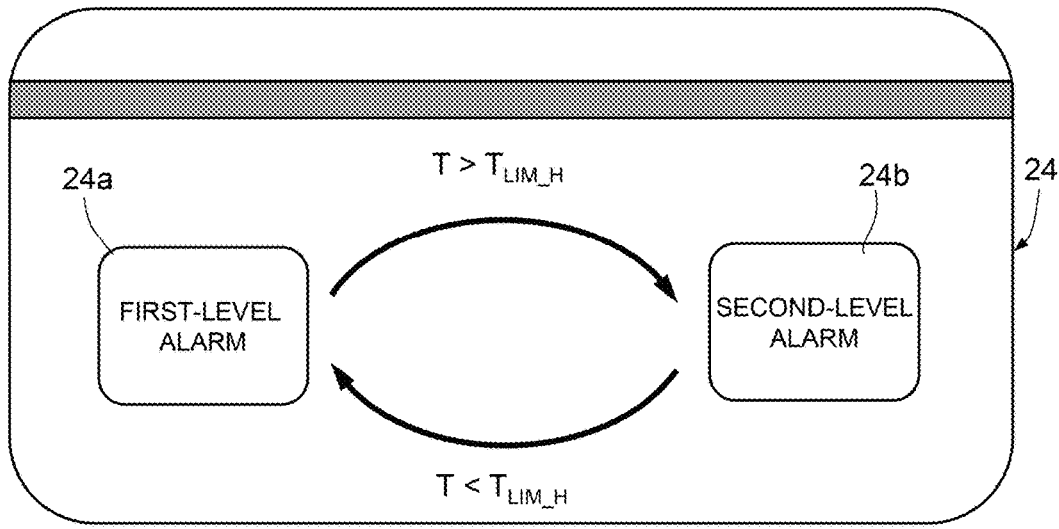

The third state 24, as illustrated in FIG. 9C, envisages a first sub-state 24a, in which the processing unit 5 determines the presence of the first level of alarm and activates the first alarm warning, for example via communication of an alarm to the responsible person (for example, via SMS message by the GSM module). Furthermore, the processing unit 5 processes the signals supplied by the environmental sensor 4 to monitor in real time the environmental conditions in the vehicle 12, for example the temperature in the passenger compartment 11.

The third state 24 further envisages a second sub-state 24b, in which the processing unit 5 determines the presence of the second level of alarm and activation of the second alarm warning, for example, via activation of sound and visual alarms or remote communication to the responsible person and/or to further subjects.

As is evident from what has been discussed previously, from the first sub-state 24a the processing unit 5 transitions or evolves to the second sub-state 24b in the case of detection of critical environmental conditions, for example in the case where the temperature is higher than the upper threshold $(T > T_{LIM\_H})$; from the second sub-state 24b it transitions or evolves to the first sub-state 24a if the absence of critical environmental conditions is detected, for example in the case where the temperature is below the upper threshold $(T < T_{LIM\_H})$. It should be noted that a hysteresis may be applied in the threshold detection, considering for the first comparison a maximum upper value, higher than the upper threshold $T_{LIM\_H}$, and a minimum upper value, lower than the upper threshold $T_{LIM\_H}$, for the second comparison. Evidently, other conditions may further be applied for the detection of the critical environmental conditions, for example a value of temperature below the lower threshold $T_{LIM\_L}$, or else the presence of a particular gas in the passenger compartment 11, or again a value of pressure higher than a given threshold.

As previously mentioned, it may be envisaged that only manual intervention will enable exit from the third state 24 (state of alarm) and return to the second state, the state of alert.

The advantages of the present solution are clear from the foregoing description.

In any case, it is again highlighted that the proposed solution is reliable and safe in the detection of presence of an occupant (for example, a child or an animal) left alone inside the vehicle in the absence of a person responsible, enabling prompt detection of a condition of danger and activation of an alarm warning. In particular, the combined use of several types of sensors (amongst which audio sensors, movement sensors, and environmental sensors) enables acquisition of a plurality of information, in particular sound information, movement information, and environmental information, joint processing of which affords the desired results of reliability and safety.

Furthermore, the solution described is technically simple to implement and has a low cost, hence favoring integration both inside the vehicle and in restraint devices for vehicle occupants (for example, baby seats) and for installation as a stand-alone device (i.e., after-market installation).

Finally, it is clear that modifications and variations may be made to what has been described and illustrated herein, without thereby departing from the scope of the present disclosure.

In particular, as previously highlighted, it is emphasized that different types of sensors could be used in the detection device; for example, the audio sensor 2 could comprise an array of microphone sensors; the movement sensor 3 could include just one between the accelerometer sensor 3a and the gyroscope sensor 3b; or the environmental sensor 4 could include different sensors for monitoring environmental conditions (for example, a gas sensor).

As previously highlighted, the sound-recognition algorithms may be applied also to animals or persons with disabilities, there possibly being envisaged specific sound patterns included in the different use scenarios.

Furthermore, the electronic detection device 1 may include further analysis units, coupled to the processing unit 5, for execution of specific processing on the signals acquired by the sensors, in this way aiding the detection unit 5: for example, a unit for analyzing audio signals (audio analyzer) could be envisaged, in order to implement dedicated analysis algorithms and possibly further improve the performance of the electronic detection device 1.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic device, comprising:
an audio sensor configured to acquire sound-sensing signals in a vehicle;
a movement sensor configured to acquire movement-sensing signals indicating movement of the vehicle itself;
an environmental sensor configured to acquire environmental-sensing signals in the vehicle; and
a processing unit coupled to receive the sound-sensing signals, the movement-sensing signals, and the environmental-sensing signals from the audio sensor, the movement sensor, and the environmental sensor, respectively, and configured to determine presence of an occupant on board the vehicle based on the sound-sensing signals, movement-sensing signals, and environmental-sensing signals and to activate a corresponding alarm warning based on that the presence of the occupant being determined;
wherein the processing unit is configured to evolve in a state of alert starting from a wait state in response to processing of at least the sound-sensing signals detecting the presence of the occupant on board the vehicle; and configured to evolve from the state of alert into a state of danger of a first level of danger in response to the processing detecting the presence of the occupant for a time interval longer than a time threshold, and
wherein the corresponding alarm warning includes a first warning at the first level of danger and a second warning, the first warning including at least a remote communication directed to a responsible person, the second warning including in addition to the remote communication directed to the responsible person an activation of one or more of a sound or a light signals at the vehicle.

2. The electronic device according to claim 1, wherein the audio sensor comprises a MEMS microphone sensor; and wherein the processing unit is configured to process the sound-sensing signals in a time domain and/or in a frequency domain to identify in the sound-sensing signals patterns indicative of the presence of the occupant on board the vehicle.

3. The electronic device according to claim 2, wherein the movement sensor includes a MEMS accelerometer sensor and a MEMS gyroscope sensor and the movement-sensing signals include linear-acceleration signals and angular-acceleration signals; and wherein the processing unit is configured to process the movement-sensing signals to identify, in the signals, patterns indicative of a state of movement, or a state of stopping, of the vehicle.

4. The electronic device according to claim 1, wherein the environmental sensor includes a temperature sensor, and the environmental-sensing signals include a temperature signal indicative of a temperature on board the vehicle; and wherein the processing unit is configured to process the environmental-sensing signals to determine a situation of danger as a function of the temperature.

5. The electronic device according to claim 1, further comprising a communication unit configured to be controlled by the processing unit to transmit the alarm warning.

6. The electronic device according to claim 5, wherein the communication unit comprises a mobile data-communication module and an associated identification module configured to access to a cellular network.

7. The electronic device according to claim 1, wherein the processing unit is configured to evolve in the state of danger from the first level of danger to a second level of danger in response to processing of the environmental-sensing signals detecting the presence of an environmental condition that is at least potentially harmful for the occupant.

8. The electronic device according to claim 7, wherein the harmful environmental condition is associated with a temperature on board the vehicle higher than maximum first threshold or lower than a second threshold.

9. The electronic device according to claim 8, wherein the processing unit is further configured to evolve again into the wait state in response to the processing of at least the movement-sensing signals detecting a condition of movement of the vehicle.

10. The electronic device according to claim 9, wherein the second warning is issued in response to the second level of danger.

11. The electronic device according to claim 1, further comprising an electronic-circuit board to which a number of chips are coupled, each chip being provided with a corresponding package, and the number of chips integrating the audio sensor, the movement sensor, the environmental sensor and the processing unit on the electronic-circuit board.

12. The electronic device according to claim 11, wherein the electronic-circuit board is configured to be integrated in a safety and restraint device for the occupant on board the vehicle.

13. The electronic device according to claim 11, wherein the electronic-circuit board is configured to be integrated in an on-board electronic system of the vehicle.

14. The electronic device according to claim 1, wherein the occupant is a child.

15. A device, comprising:
an electronic detection circuit including:
an audio sensor that in operation senses sound signals in a passenger compartment of a vehicle;
a movement sensor that in operation senses movement signals indicating movement of the vehicle itself;
an environmental sensor that in operation senses environmental signal of an environmental condition of the passenger compartment; and
a processing circuit coupled to the audio, movement and environmental sensors and that in operation processes the sound, the movement, and the environmental signals to determine a presence of an occupant in the passenger compartment, and that in operation activates an alarm warning the based on the detected presence of the occupant;
wherein the processing circuit is configured to evolve in a state of alert starting from a wait state in response to processing of at least the sound signals detecting the presence of the occupant on board the vehicle; and configured to evolve from the state of alert into a state of danger of a first level of danger in response to the processing detecting the presence of the occupant for a time interval longer than a time threshold; and wherein the alarm warning includes a first warning at said first level of danger and a second warning, the first warning including at least a remote communication directed to a responsible person, the second warning including in addition to said remote communication directed to the responsible person an activation of one or more of a sound or a light signals at the vehicle.

16. The device of claim 15 wherein the electronic detection circuit is attached to a baby seat.

17. A method, comprising:
acquiring sound-sensing signals on board a vehicle;
acquiring movement-sensing signals indicating the movement of the vehicle itself;
acquiring environmental-sensing signals on board the vehicle;
processing the sound-sensing signals, the movement-sensing signals, and the environmental-sensing signals to detect a presence of an occupant on board the vehicle;
determining a situation of danger responsive to the processing of the sound-sensing, the movement-sensing, and the environmental-sensing signals;
activating an alarm warning in response to the determining indicating the situation of danger;
starting from a wait state, transitioning into a state of alert based on the processing of at least the sound-sensing signals detecting the presence of the occupant on board the vehicle; and
transitioning from the state of alert into a state of danger having a first level of danger based on the processing detecting the presence of the occupant on board the vehicle for a time interval that exceeds a time threshold, wherein the corresponding alarm warning includes a first warning corresponding to the first level of danger and a second warning, the first warning including at least a remote communication directed to a responsible person, the second warning including in addition to the remote communication directed to the responsible person an activation of one or more of a sound or a light signals at the vehicle.

18. The method according to claim 17, wherein the processing further comprises transitioning from the state of danger having the first level of danger to the state of danger having a second level of danger based on the processing of the environmental-sensing signals detecting presence of an environmental condition harmful to the occupant and the second warning corresponds to the second level of danger.

* * * * *

UNITED STATES PATENT AND TRADEMARK OFFICE
CERTIFICATE OF CORRECTION

PATENT NO. : 10,814,744 B2
APPLICATION NO. : 16/222569
DATED : October 27, 2020
INVENTOR(S) : Andrea Labombarda et al.

Page 1 of 1

It is certified that error appears in the above-identified patent and that said Letters Patent is hereby corrected as shown below:

In the Claims

Column 10, Line 58, Claim 15:
"warning the based" should read, --warning signal based--.

Signed and Sealed this
Twenty-ninth Day of December, 2020

Andrei Iancu
*Director of the United States Patent and Trademark Office*